(12) United States Patent  
Kameyama

(10) Patent No.: US 6,295,140 B1  
(45) Date of Patent: Sep. 25, 2001

(54) DOCUMENT READING APPARATUS HAVING A WHITE PLATEN ROLLER

(75) Inventor: Kenji Kameyama, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/104,809

(22) Filed: Jun. 25, 1998

(30) Foreign Application Priority Data

Jun. 30, 1997 (JP) .................................................. 9-173976  
Apr. 8, 1998 (JP) .................................................. 10-96184

(51) Int. Cl.[7] .................................................. H04N 1/40
(52) U.S. Cl. .................. 358/461; 358/496; 358/498; 358/444; 358/465
(58) Field of Search .................................... 358/461, 464, 358/465, 463, 406, 413, 496, 444; 382/274

(56) References Cited

U.S. PATENT DOCUMENTS 5,107,350 * 4/1992 Omori .................................. 358/461  
5,644,409 * 7/1997 Irie et al. ............................ 358/461

FOREIGN PATENT DOCUMENTS 270170  3/1990 (JP) .  
4183166  6/1992 (JP) .

* cited by examiner

Primary Examiner—Cheukfan Lee  
(74) Attorney, Agent, or Firm—Cooper & Dunham LLP

(57) ABSTRACT

A document reading apparatus that includes a white platen roller and image sensor positioned at an image reading portion of the apparatus. The white platen roller is used to provide white reference data used for shading correction when reading an original document. The image sensor selectively reads the white platen roller and outputs signal characteristic data after reading the white platen roller. The apparatus also includes a controller configured to control the reading of the white platen roller so that the image sensor reads the white platen roller a predetermined number of times. The controller also controls movement of the white platen roller so that a motor used to move the white platen roller is de-energized when the image sensor reads the white platen roller. The controller receives the output signal characteristic data from the image sensor and compares the read output signal characteristic data to pre-existing signal characteristic data to determine if an abnormality exists in the read output signal characteristic data. When an abnormality is determined, the read output signal characteristic data is not used as white reference data but when no abnormality is determined the controller stores in memory the output signal characteristic data as white reference data.

53 Claims, 14 Drawing Sheets

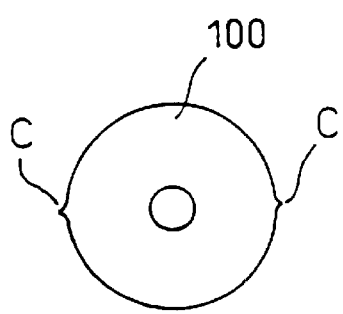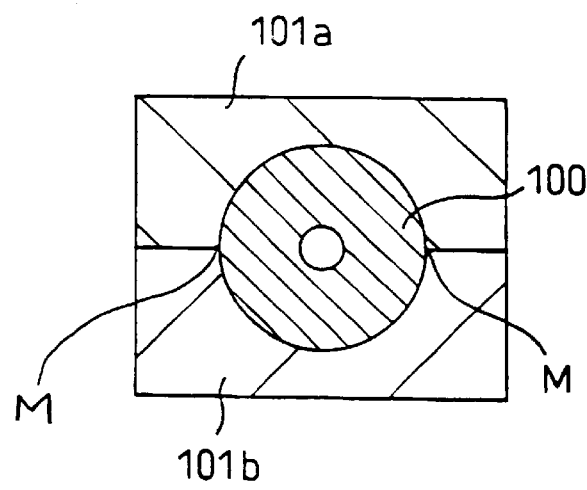
Fig. 1a
Prior Art
Fig. 1b
Prior Art

DOCUMENT READING APPARATUS HAVING A WHITE PLATEN ROLLER

BACKGROUND

1. Field

This present application generally relates to a document reading apparatus for document readers, copy machines, facsimile machines and other machines used to replicate an original image. More particularly, the present application relates to a document reading apparatus having a white platen roller which is used for shading correction.

2. Description of the Related Art

Document reading apparatus used, for example, in copy machines, facsimile machines and document readers (or scanners), typically obtain a reference measurement prior to scanning one or more original documents in order to compensate for shading variations in the original documents. This compensating process is known as shading correction.

One type of conventional document reading apparatus which has a contact-type image sensor and provides shading correction is disclosed in Japanese Laid-Open Patent Application No.4-183166. This apparatus has a white platen roller which makes contact with the contact-type image sensor at a document reading position. The document is read when it is transported in a state pinched between the contact-type image sensor and the white platen roller.

One drawback to such document reading apparatus is that the outer peripheral surface of the white platen roller becomes dirty due to contact between the roller and the document. That is, the white platen roller collects dust or other debris due to the contact between the roller and documents. As a result, if the contact-type image sensor reads the dirty portion of the white platen roller it is difficult to carry out accurate shading correction.

Another type of document reading apparatus that provides shading correction is described in Japanese Laid-Open Patent Application No.2-70170. This apparatus also uses a white platen roller and a contact-type image sensor. In this document reading apparatus the white platen roller is rotated to different positions and at each position a reference white signal is measured by the image sensor. The output of the contact-type image sensor (i.e., each reference white signal) is stored and compared to each previously stored reference white signal by a comparison circuit. If a newly measured reference white signal is greater than the stored one, the new reference white signal is stored. Thus, a maximum reference white signal is maintained in memory, and the maximum reference white signal is used for shading correction.

Typically, the white platen rollers are manufactured with metallic molds 101*a* and 101*b*, seen in FIG. 1*b*, which when joined create crevices 'M'. These crevices create burrs on an outer peripheral surface of the rollers, as shown in FIG. 1*a*. The burrs 'C' are typically created on opposite sides of the circumference of the white platen roller 100.

If the contact-type image sensor reads near a burr on the white platen roller, the output of the image sensor will reflect a problem that is similar to the case where dirt on the white platen roller is read, which may result in inaccurate shading correction.

Further, most document reading apparatus use a motor is used to move or rotate the white platen roller. When the motor is actuated electrical noise is typically generated and radiates within the document reading apparatus. Therefore, if the contact-type image sensor reads the white platen roller while the motor is energized, the electrical noise may mix with output of the image sensor and affect the white reference data which may result in inaccurate shading correction.

SUMMARY

The present application provides a document reading apparatus that reads original documents and includes a white platen roller, an image sensor and a controller. The white platen roller and image sensor are positioned at an image reading portion of the apparatus, and are used to feed and read an original document for subsequent reproduction. The white platen roller and image sensor are also used to generate white reference data that is used by the controller for shading correction. Generally, the image sensor reads the white platen roller and outputs signal characteristic data after reading the white platen roller. The signal characteristic data is then fed to the controller. The controller controls the reading of the white platen roller so that the image sensor reads the white platen roller a predetermined number of times. The controller also controls the movement of the white platen roller so that a motor used to move the white platen roller is de-energized when the image sensor reads the white platen roller. The controller receives the output signal characteristic data from the image sensor and compares the read output signal characteristic data to pre-existing signal characteristic data to determine if an abnormality exists in the read output signal characteristic data. When an abnormality is determined, the read output signal characteristic data is not used as white reference data, but when no abnormality is determined the controller stores in memory the output signal characteristic data as white reference data.

The pre-existing output signal characteristic data may be user entered data stored in memory, or the pre-existing output signal characteristic data may be output signal characteristic data from an earlier reading of the white platen roller by the image sensor.

Preferably, the image sensor includes comprises an array of photoelectric cells and the output signal characteristic data for each cell in the array includes a bit location and a signal amplitude.

The present application also provides a method for reading an original document with a document reading apparatus. The method includes reading a white platen roller in an image reading portion and generating first output signal characteristic data, storing the first output signal characteristic data, energizing a motor used to move the white platen roller and feeding the original document, de-energizing the motor before the original document reaches the image reading portion, reading a different portion of white platen roller in an image reading portion and generating second output signal characteristic data, comparing the first and second output characteristic data, and storing the first or second output signal characteristic data as white reference data based on a result of the comparing.

BRIEF DESCRIPTION OF THE DRAWINGS

Preferred embodiments of the invention are described hereinbelow with reference to the drawings wherein:

FIG. 1*a* is a side view of a conventional white platen roller;

FIG. 1*b* is a cross-sectional view of a conventional white platen roller and metallic mold;

DETAILED DESCRIPTION

Figure 2:
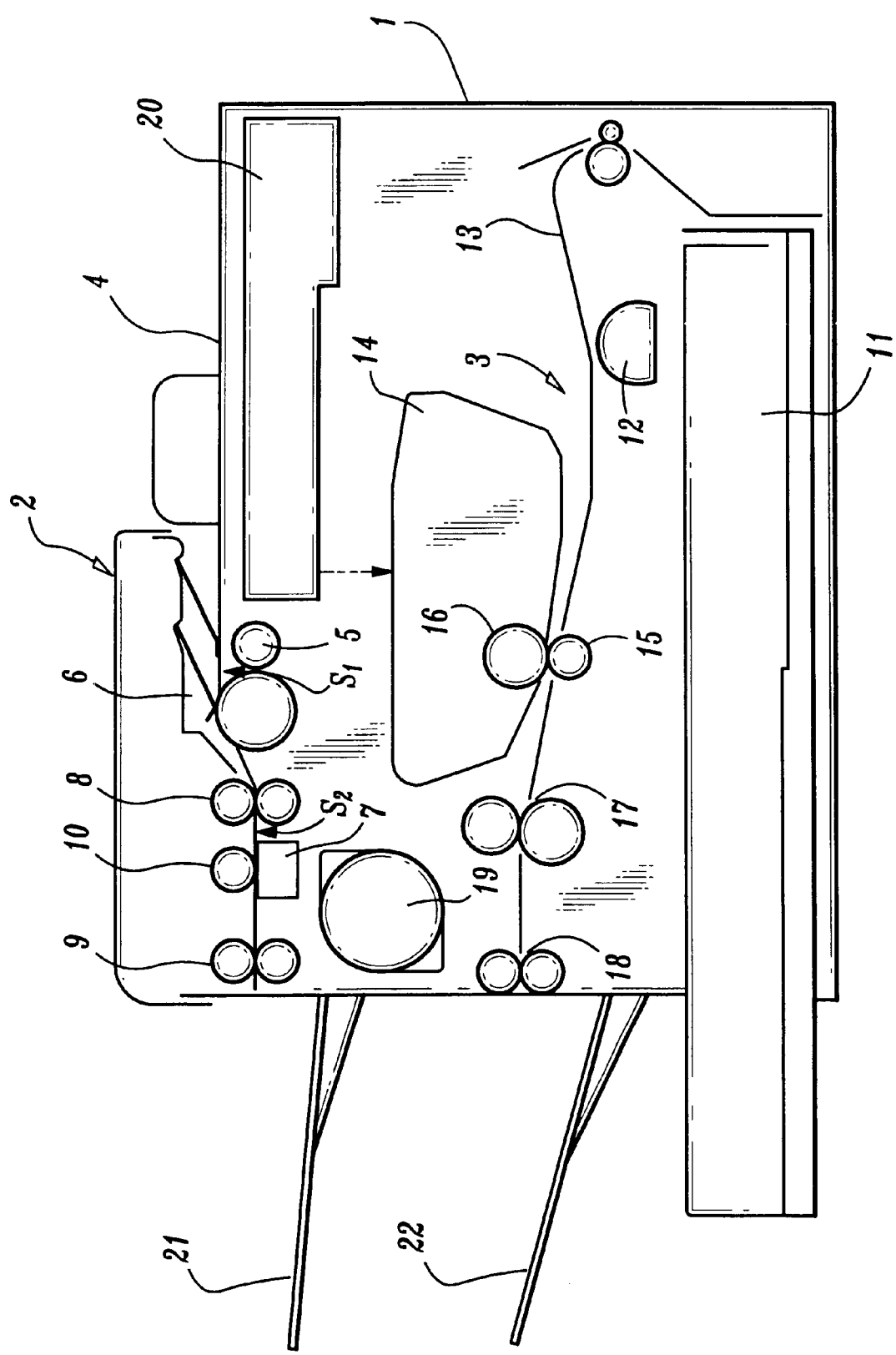
FIG. 2 is a schematic view of an embodiment of a facsimile apparatus according to the present application.

The document reading apparatus (or unit) according to the present application may be used in facsimile machines, copy machines, document scanners and like machines that replicate original documents. However, for the embodiments described herein the document reading unit will be described in conjunction with a facsimile machine, such as the facsimile machine shown in FIG. 2. In FIG. 2, the facsimile machine 1 includes a document reading unit 2, an image forming unit 3, original document table 4 original document output tray 21, sheet cassette 11 and copy sheet output tray 22.

In operation a stack of original documents on document table 4 are picked up by pick-up roller 5 and separated one by one from the stack by a separation unit 6. The separated document is fed to a image reading portion (IRP) by a pair of feed rollers 8, and discharged onto output tray 21 after passing through the image reading portion by a pair of feed rollers 9.

The document reading apparatus also includes a rotatable white platen roller 10 in contact with a contact-type image sensor 7 and the area where the roller contacts the sensor is known as the image reading portion. The contact-type image sensor 7 has a plurality of photoelectric cells arranged in a main scanning direction, a light emitting diode (LED) array and a rod lens array. An outer peripheral portion of the white platen roller 10 is made of a white resilient material, such as rubber.

A motor unit 19 drives the rollers in the a document reading unit 2, including the white platen roller 10.

As an original document is transported through the image reading portion, the contact-type image sensor outputs an image signal in response to an input light signal generated by the LED array.

A sensor S1 positioned between pick-up roller 5 and separation unit 6 detects when a document placed on the document table 4 is located between the pick-up roller 5 and separation unit 6. A sensor S2 positioned between the feed rollers 8 and the image reading portion detects when an edge of the document is located between the feed rollers 8 and image reading portion.

If the facsimile machine 1 is printing out an image, the image forming unit 3 is used. In the image forming unit 3 a recording sheet is picked-up from the stack of sheets in the sheet cassette 11 by a pick-up roller 12 which is half-round shaped. The recording sheet is then fed to a transfer roller 15 along a sheet guide 13.

Laser luminous source unit 20 exposes the photoconductive drum 16 to form a latent image.

A toner image on a photoconductive drum 16 is transferred to the recording sheet as the sheet passes between the drum 16 and the transfer roller 15. The photoconductive drum 16 is provided in a process cartridge 14 that also includes a charging unit, toner supply unit, developing unit and a cleaning unit.

After the toner image is transferred, the toner image on the recording sheet is fused in a state pinched between a pair of fusing rollers 17, and then the recording sheet is discharged to a sheet output tray 22 by a pair of feed rollers 18.

Figure 3:
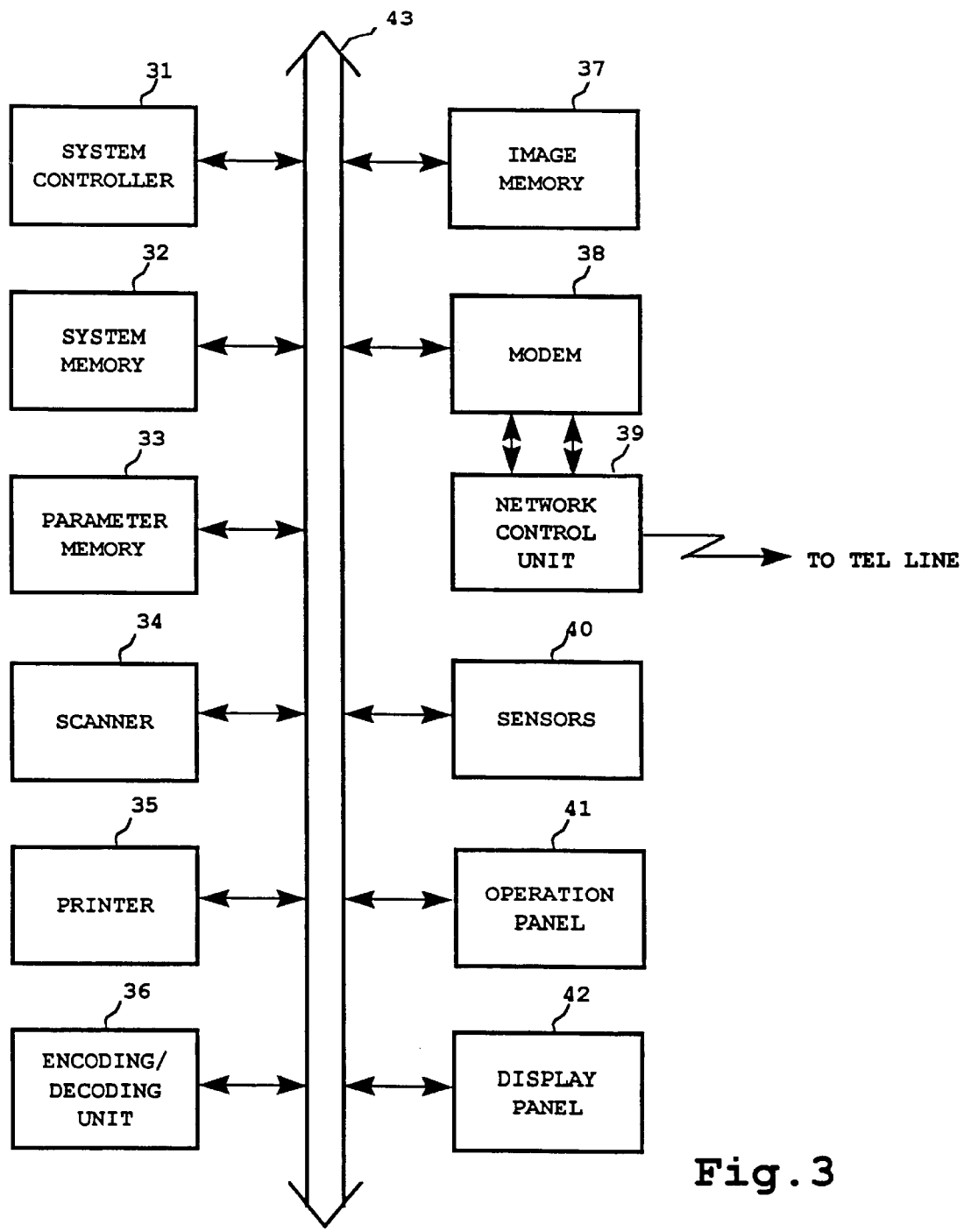
FIG. 3 is a block diagram of the facsimile apparatus in FIG. 2.

Referring to FIG.3, an exemplary block diagram for the control hardware of the facsimile machine 1 is provided. In this embodiment, the control hardware includes a system controller 31, a system memory 32, a parameter memory 33, a scanner 34, a printer 35, an encoding/decoding unit 36, an image memory 37, a modem 38, a network control unit 39, sensors 40, an operation panel 41, a display panel 42, and an internal bus 43.

The system controller 31 controls the operation of the facsimile apparatus 1 in response to control programs stored in system memory 32 and parameter data stored in parameter memory 33. The parameter memory 33 stores various kinds of parameters, such as resolution or contrast of scanning, and information specific to the facsimile apparatus 1, such as a full digit of abbreviated dialing, and has a working memory area used by the system controller 31. The parameter memory 33 also stores white reference data which is generated by the contact-type image sensor 7 when it reads the white platen roller 10. The white reference data is used for shading correction.

The scanner 34 is constructed of the document reading unit 2, and reads original documents as described above. The printer 35 is constructed of the image forming unit 3, and prints out an image on the recording sheet in the above mentioned manner. The encoding/decoding unit 36 encodes an input image signal of the original document and compresses the image signal for transmission, and decodes compressed received data into a format for printing.

The image memory 37 stores the compressed image data to be transmitted and the received data from other facsimile apparatus. The modem 38 performs functions of a modem for, e.g., a Group 3 facsimile machine, and includes a low-speed modem function, such as a V.21 modem, for transmitting and receiving communication protocols and a high-speed modem function, such as V.17, V.34, V.29, V.27ter modems, for transmitting and receiving image information. The network control unit 39 includes an automatic transmitting and receiving function and controls connections to the telephone line.

The sensors 40 detect trouble and status of the facsimile machine 1 and includes the sensors S1 and S2. The operation panel 41 includes various kinds of operational keys for inputting command and parameter information, and for setting operational modes of the facsimile machine 1. The display panel 42 displays guidance and other information for operator viewing.

The internal bus 43 is connected to the system controller 31, system memory 32, parameter memory 33, scanner 34, printer 35, encoding/decoding unit 36, image memory 37, a modem 38, sensors 40, operation panel 41, display panel 42 and allows communications between the different units. The network control unit 39 also has direct connections to the modem 38.

Figure 4:
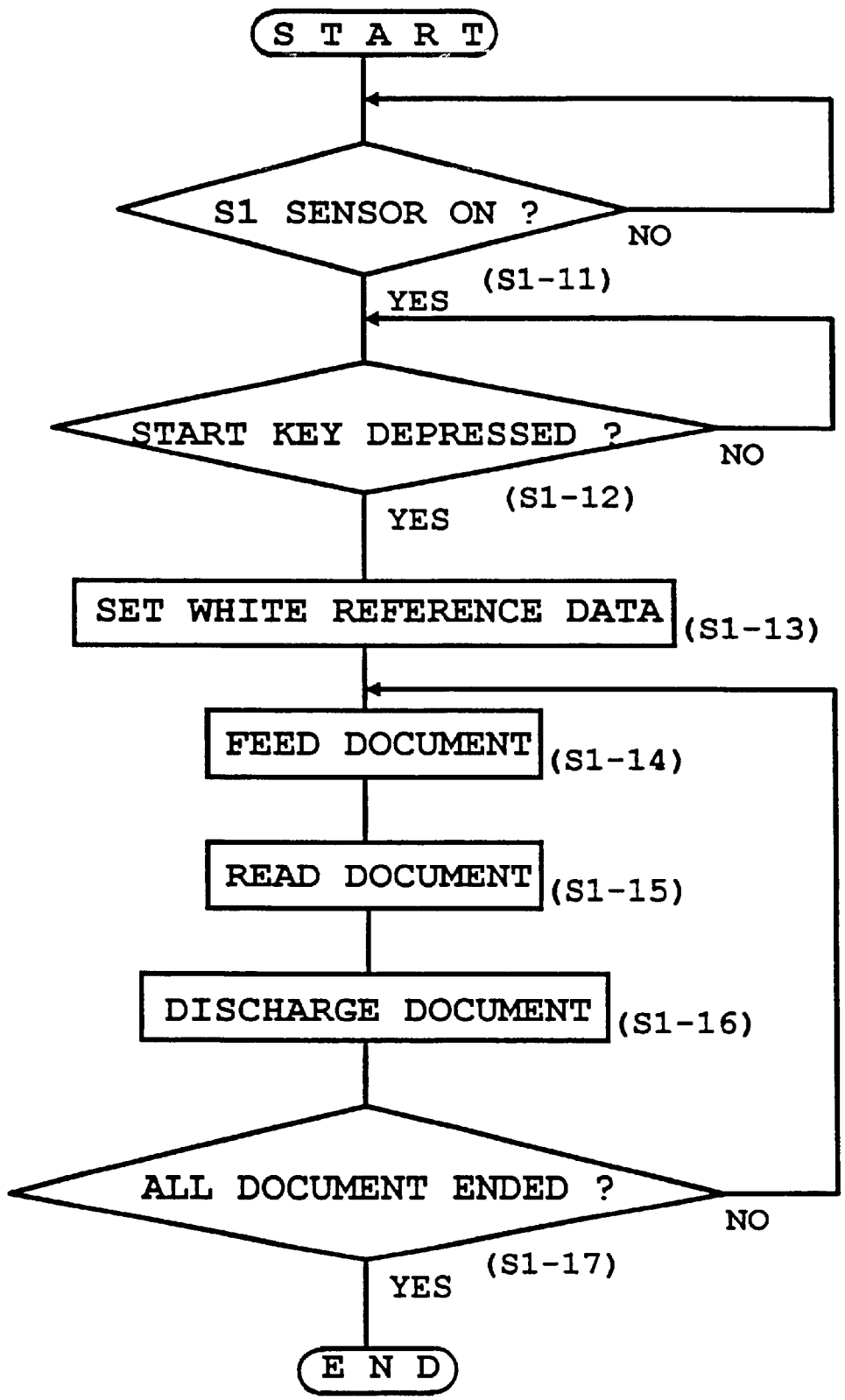
FIG. 4 is a flow chart for a document reading operation according to the present application.

Turning now to FIG. 4, a description of an exemplary embodiment of a document reading operation of the document reading unit 2 according to the present application is provided. Initially, in step S1-11, sensor S1 is continuously checked to determine whether or not an original document is placed on the document table 4. If a document is placed on the document table 4, a determination is made as to whether a start key of the operation panel 41 has been depressed (S1-12).

If the start key is depressed, a white reference data setting operation is performed (S1-13), and after the white reference data is set the original document is fed to the image reading portion (S1-14) where the document is read by the image sensor 7 (S1-15). After the original document is read, the document is discharged by the feed rollers 9 (31-16). In step S1-17, a determination is made as to whether all the documents in the tray 4 have been read. This determination is based on the output signals of sensors S1, S2. For example, if the sensor S2 detects an end edge of a previous document and the sensor S1 detects a next document on the document table 4, then the next document is fed to the image reading portion and the process returns to step S1-14. If the sensor S2 detects an end edge of a previous document and the sensor S1 does not detect a next document on the document table 4, then the reading operation is finished.

Figure 5:
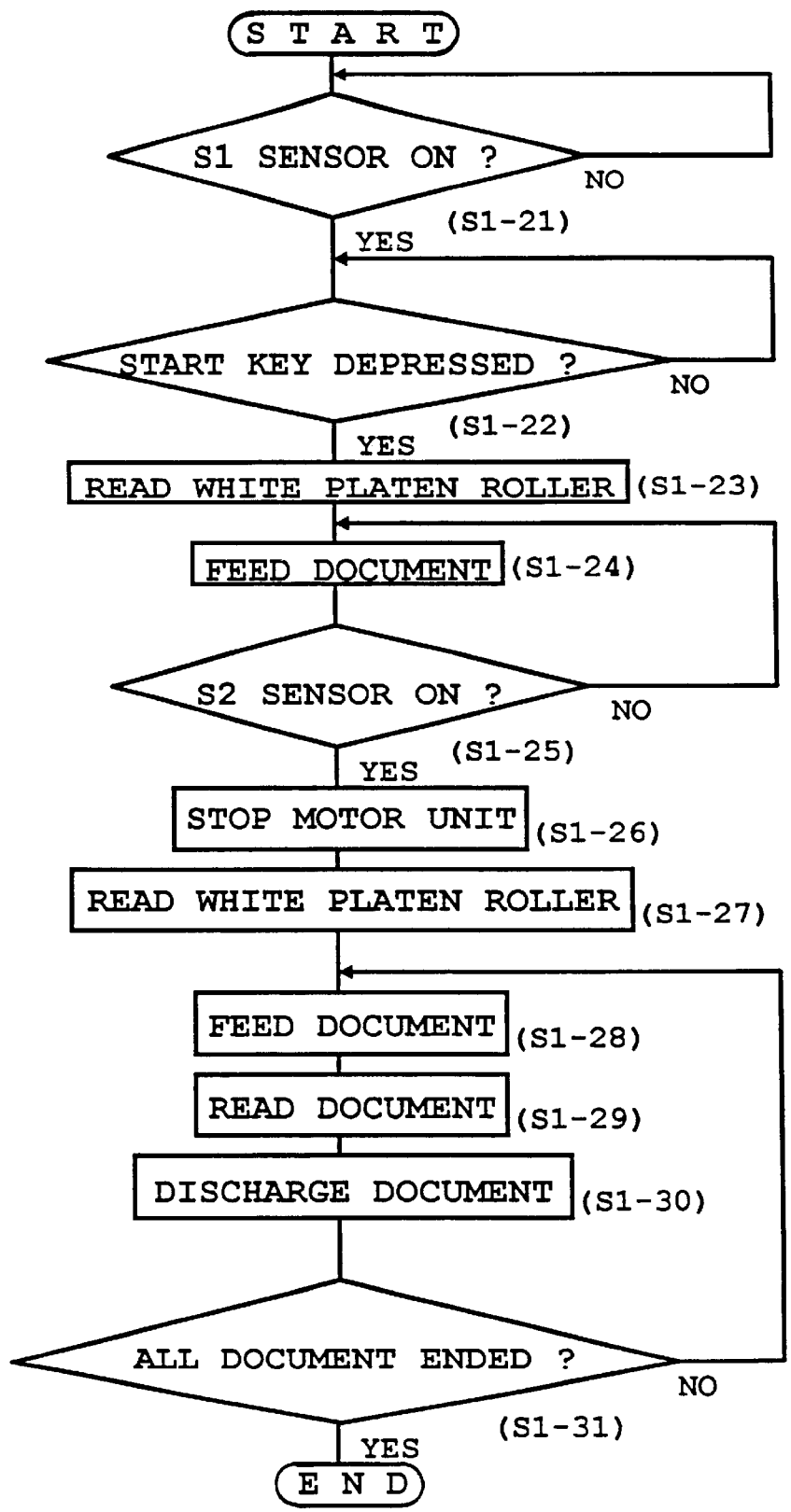
FIG. 5 is a flow chart for a document reading operation similar to FIG. 4 including a white reference data setting operation according to one embodiment of the present application.

Referring now to FIG. 5, one embodiment for setting the white reference data is provided. As described above, initially sensor S1 is continuously checked to determine whether or not an original document is placed on the document table 4. If a document is placed on the document table 4, a determination is made as to whether a start key of the operation panel 41 has been depressed (S1-22).

If the start key is depressed, the contact-type image sensor 7 reads the surface of the white platen roller 10 to set the white reference data (S1-23). The contact type image sensor can read the white platen roller while the roller is moving and the motor unit 19 is energized or when the roller is stationary and the motor unit 19 is not energized. Preferably, the motor unit 19 is not energized so that noise generated by the motor unit 19 does not mix with the output of the image sensor and affect the white reference data. The remaining description will include energizing and de-energizing the motor unit 19 when reading the image sensor, however, the present application is not to be construed as being limited to this operation because the image sensor can read the roller while the motor is energized or de-energized.

After the initial white reference data is obtained, the motor unit 19 is energized and the rollers in the document reading unit 2 rotate so that a document in tray 4 is separated from other documents in the tray and fed toward the image reading portion (S1-24).

If the initial white reference data is not acceptable (i.e., the characteristics of the white reference data do not meet predefined requirements) the platen roller is read at least one more time to try to obtain acceptable white reference data. If the white platen roller is to be read one or more additional times, the system controller 21 stops the motor unit 19 when the sensor S2 detects the head of the document (steps S1-25 and S1-26). The contact-type image sensor 7 then reads the white platen roller 10, preferably while the motor unit 19 is not energized (S1-27). At this time, the contact-type image sensor 7 reads a different position of the white platen roller 10.

After the white reference data setting operation is performed and acceptable white reference data is obtained, the motor unit 19 is then energized and the rollers rotate to continue feeding the document (S1-28). Then, the document is fed through the image reading portion so that the contact-type image sensor 7 reads the document (S1-29), and the feed rollers 9 discharge the document after the image is read (S1-30).

In step S1-31, a determination is made as to whether all the documents in the tray 4 have been read. This determination is based on the output signals of sensors S1, S2. For example, if the sensor S2 detects an end edge of a previous document and the sensor S1 detects a next document on the document table 4, then the next document is fed to the image reading portion and the process returns to step S1-28. If the sensor S2 detects an end edge of a previous document and the sensor S1 does not detect a next document on the document table 4, then the reading operation is finished.

If unacceptable white reference data is obtained after the setting operation is performed, a message is provided to a user to clean the white platen roller or that repair is necessary.

In the above embodiment of FIG. 5, the contact-type image sensor 7 is configured to read the white platen roller twice, but it is also contemplated that the white platen roller can be read more than two times. The system controller 21 controls the operation of the motor unit 19 in accordance with a predefined reading number representing the number of times the white platen roller is to be read. As the reading number of the white platen roller increases, the time interval between the start and stop of rotation of the white platen roller 10 becomes sorter.

One way to determine if dirt or other particles are on the white platen roller is by checking the output signal of the image sensor 7 and if the characteristics of the output signal do not satisfy pre-existing characteristics then an abnormality is deemed to exist. Pre-existing characteristics may be user defined characteristics or characteristics from previous readings of the white platen roller by the image sensor.

Figure 6A:
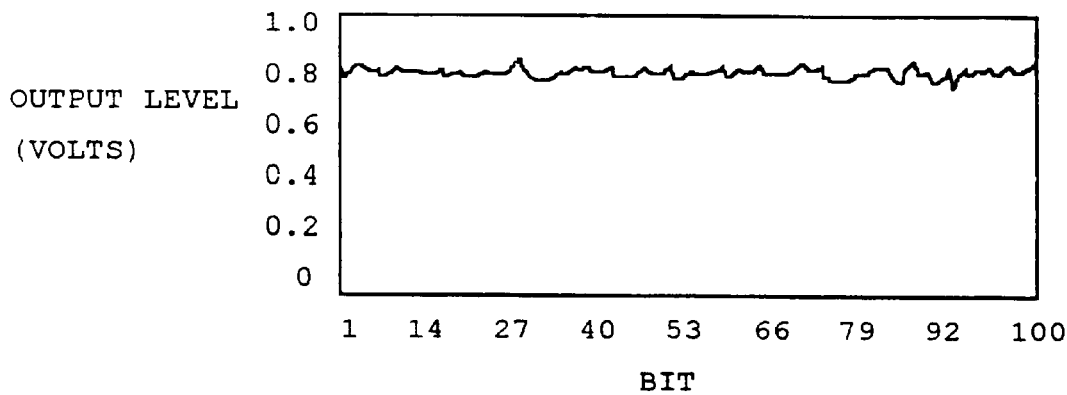
FIGS. 6a–6c are graphs of output signal characteristics of a contact-type image sensor from the white reference data setting operation of FIG. 5.
Figure 6B:
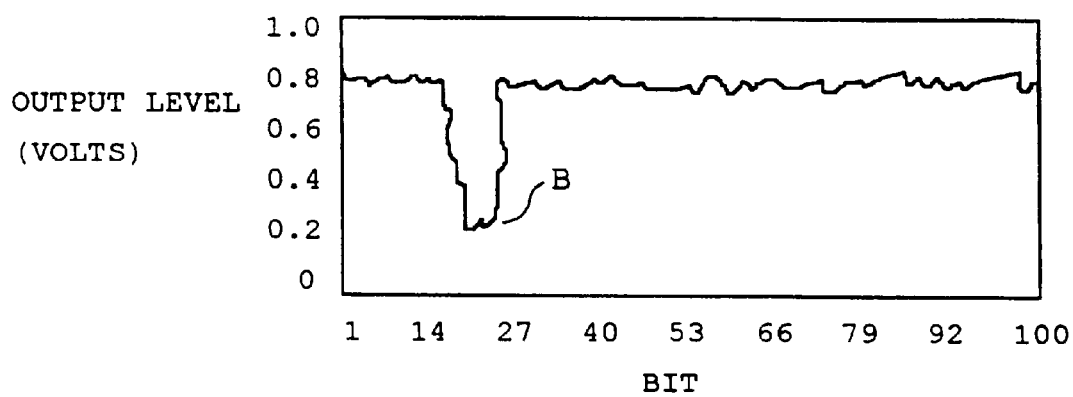

FIGS. 6a and 6b illustrate graphs of the output signal characteristics of the image sensor 7 during the white reference data setting operation in, for example, FIGS. 4 and 5. In FIGS. 6a and 6b, the vertical axis shows the output signal amplitudes along the array of photoelectric cells (of the image sensor) and the horizontal axis shows the bit position of photoelectric cells in the array. The vertical axis is marked from 0 to 1.0 volt typically because the output signal characteristics can vary depending upon the performance and operational characteristics of an amplifier in the image sensor. The horizontal axis is marked from 0 to 100 to represent the bit number (or position) of a photoelectric cell in the array. The number of bits in the array may vary depending on, for example, the maximum size paper scannable and the resolution of the sensor. In the embodiment of FIGS. 4 and 5, the output signal level is high (e.g., 0.8 volt) when the photoelectric cell reads a white portion of the roller, and lowers when the photoelectric cell reads a darker portion of the roller.

Figure 6C:
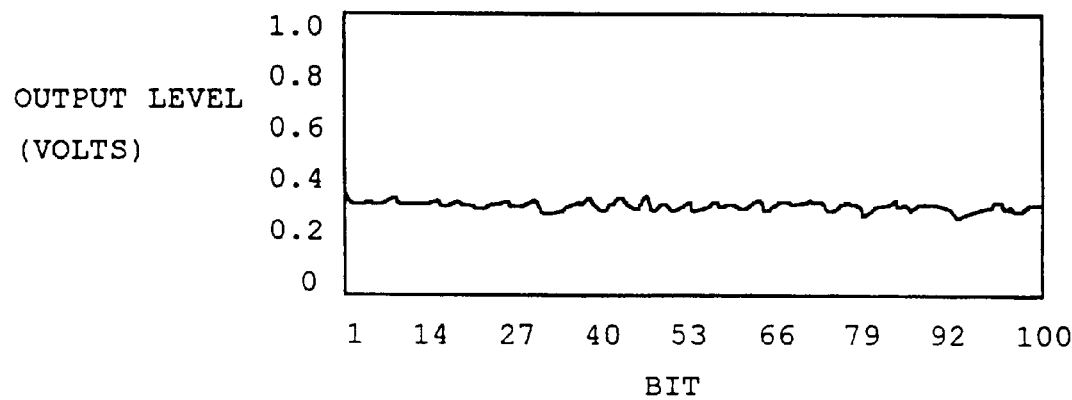
Figure 7:
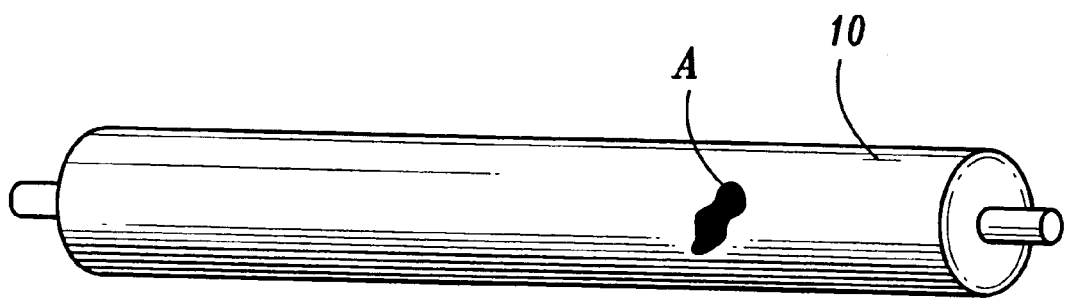
FIG. 7 is a perspective view of a white platen roller having a dirty portion.

If the contact-type image sensor 7 reads the white platen roller 10 which is in a normal condition (i.e., no dirt or other particles or defects exists on the outer surface of the roller), the output signal amplitude for each bit position in the array is relatively the same, as seen in FIG. 6a. If the contact-type image sensor 7 reads a dirty portion (A) on the white platen roller 10 (seen in FIG. 7), the output signal amplitude includes an uncharacteristic low portion (B), as seen in FIG. 6b. If the contact-type image sensor 7 reads a burr along the white platen roller, the output signal amplitude for many bit positions in the array are uncharacteristically low, as seen in FIG. 6c.

To determine if a measured dirty portion is sufficient to warrant cleaning of the white platen roller, the system controller 21 compares the read output signal characteristics to the pre-existing signal characteristics. For example, the output signal amplitude of each cell is compared with the output signal amplitude of an adjacent photoelectric cell. If there is a difference in the output levels that exceeds a predetermined value (e.g., a 30% difference in levels) the system controller 21 determines that the bit measured an abnormal condition (e.g., dirt) on the roller. However, if the difference in the output levels is less than the predetermined value (e.g., less than 30%) it is possible to correct the bit measuring the dirt or other debris using shading correction techniques, and the system controller 21 determines the bit to be normal.

It should be noted that the predetermined value may vary depending on various factors, such as the performance characteristics of the image sensor and the shading correction process. Further, the white reference data may be stored as a raw analog output signal or the data may be converted to digital data by an A/D converter and stored.

Next, a description will be given of another embodiment of the white reference data setting operation according to the present application, by referring to FIGS. 8 and 9.

Figure 8:
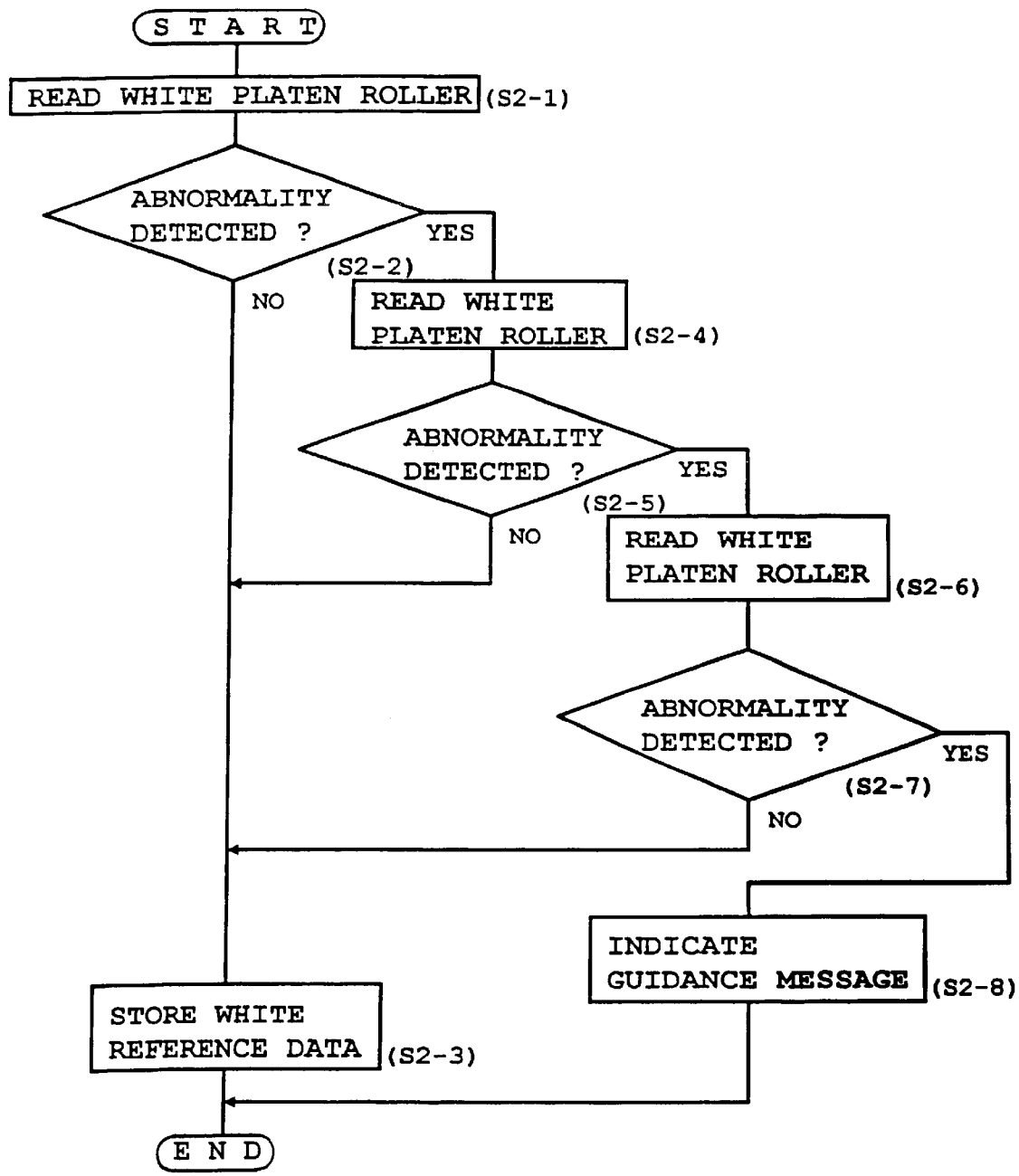
FIG. 8 is a flow chart for a white reference data setting operation according to a first embodiment of the present application.

In FIG. 8, the contact-type image sensor 7 initially reads the white platen roller 10 to obtain white reference data prior to reading an original document (S2-1). When the sensor reads the roller, the motor unit 19 is preferably de-energized, so the white platen roller 10 is stationary. Then, the system controller 21 determines whether or not the characteristics of the image sensor output meet the predefined requirements described above (S2-2).

Figure 9A:
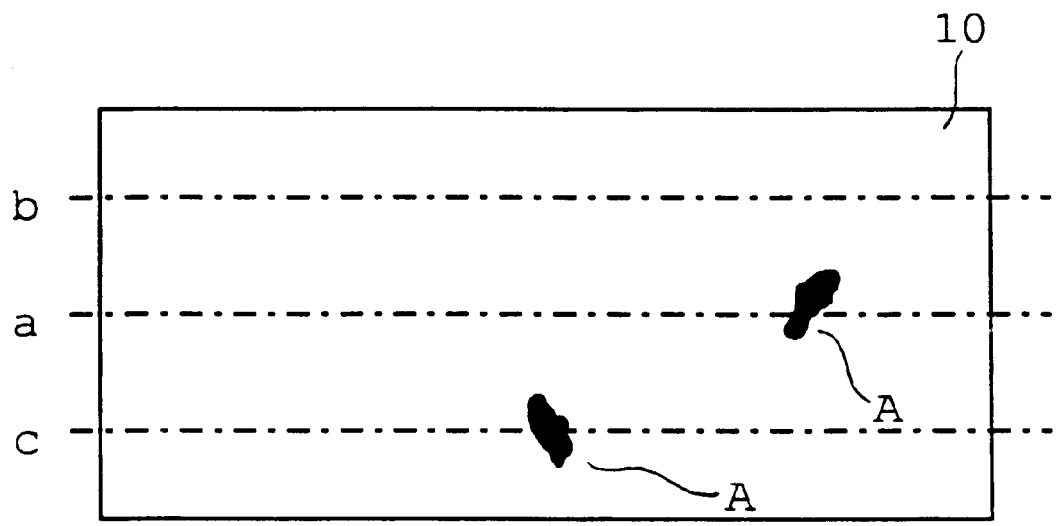
FIG. 9a is a schematic diagram of a surface of a white platen roller with multiple dirty portions thereon.
Figure 9B:
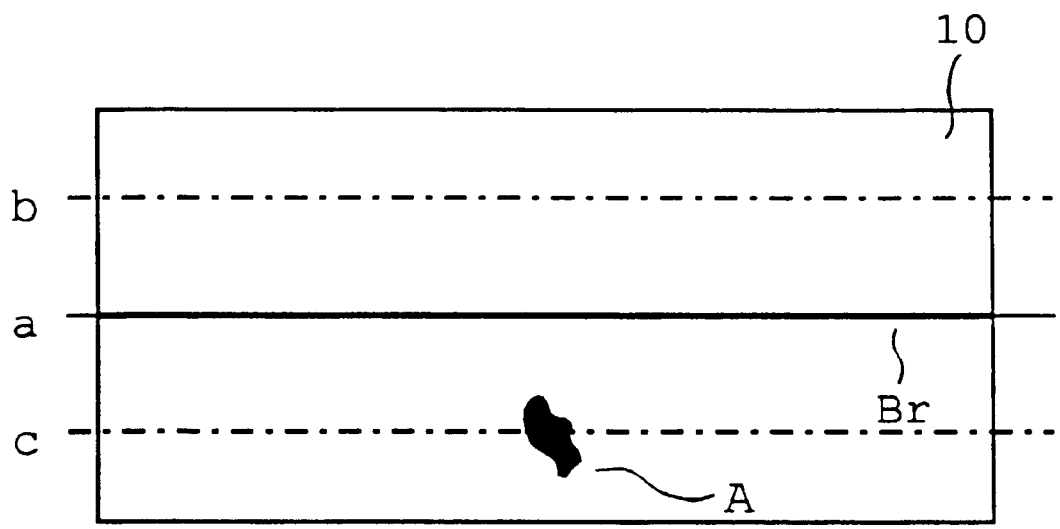
FIG. 9b is a schematic diagram of a surface of a white platen roller with a burr and a dirty portion thereon.

If, for example, the contact-type image sensor 7 reads a line 'b' shown in FIGS. 9a and 9b, an abnormality is not detected in the output signal level because there is no burr or dirty portion on line 'b' (step S2-2). In this case, the system controller 31 stores the output signal, which is read in step S2-1, in the parameter memory 33 as white reference data for use in shading correction (S2-3). After that, the motor unit 19 is energized and starts moving of the rollers in the a document reading unit 2 to read the document.

If in step S2-2 the contact-type image sensor 7 reads a line 'a' shown in FIGS. 9a and 9b, an abnormality is detected because there is a dirty portion A on line 'a' (FIG. 9a) or a burr Br on line 'a' (FIG. 9b). In this case, the motor unit 19 is energized and starts moving the rollers in the document reading unit 2. The system controller 21 then de-energizes the motor unit 19 when the 32 sensor detects the head of the document, and the contact-type image sensor 7 then reads a different portion of the white platen roller 10, preferably, while the motor unit 19 is not energized (S24).

After that, the system controller 31 again determines whether or not there is an abnormality in the output signal level of the sensor (S2-5). If the contact-type image sensor 7 reads the normal line (e.g., line b in FIGS. 9a or 9b), there is no abnormality detected in the output signal, and the system controller 31 stores the newly read output signal characteristics (e.g., amplitude and/or bit) in the parameter memory 33 as white reference data for use in shading correction (S2-3). On the other hand, if in step S2-5 the contact-type image sensor 7 reads another dirty portion on a line, such as line 'c' seen in FIGS. 9a or 9b, an abnormality is detected and the motor unit 19 is energized and the white platen roller 10 is rotated. The system controller 31 de-energizes the motor unit 19 when the white platen roller 10 is rotated a predetermined angular value so that the contact-type image sensor 7 reads a different portion of the white platen roller 10, preferably, while the motor unit 19 is not energized (S2-6).

The system controller 31 again determines whether or not there is an abnormality in the newly read output signal characteristics (S2-7). If no abnormality is detected in the output signal characteristics, the newly read output signal characteristics is stored in the parameter memory 33 as white reference data for use in shading correction (S2-3).

On the other hand, if an abnormality is detected a third time, the system controller 31 generates a guidance message instructing the operator to clean the white platen roller and displays the message on the display panel 42 display (S2-8).

In this embodiment, it is possible to obtain accurate white reference data because the contact-type image sensor 7 reads the white platen roller 10 at various points along the periphery of the roller. Furthermore, in this embodiment if the contact type image sensor reads the white platen roller while the motor is not energized, the mixing of noise generated by the motor into the white reference data can be prevented.

Another feature of this embodiment is that detecting which bits in the output signal level are not within the predetermined characteristics can also be used to differentiate between whether a burr, dirty portion or other abnormality exists on the white platen roller or a fault exists with a photoelectric cell. To illustrate, if a detected abnormality is caused by dirt or debris on the white platen roller, the position of an abnormal bit typically changes at random with each reading of the different portions of the white platen roller. However, if a detected abnormality is due to a defective photoelectric cell, the position of the abnormal bit will be the same for each reading of the white platen roller. Thus, if the controller continuously detects an abnormality at the same bit, a conclusion can be made that the problem is a defective photoelectric cell.

Figure 10:
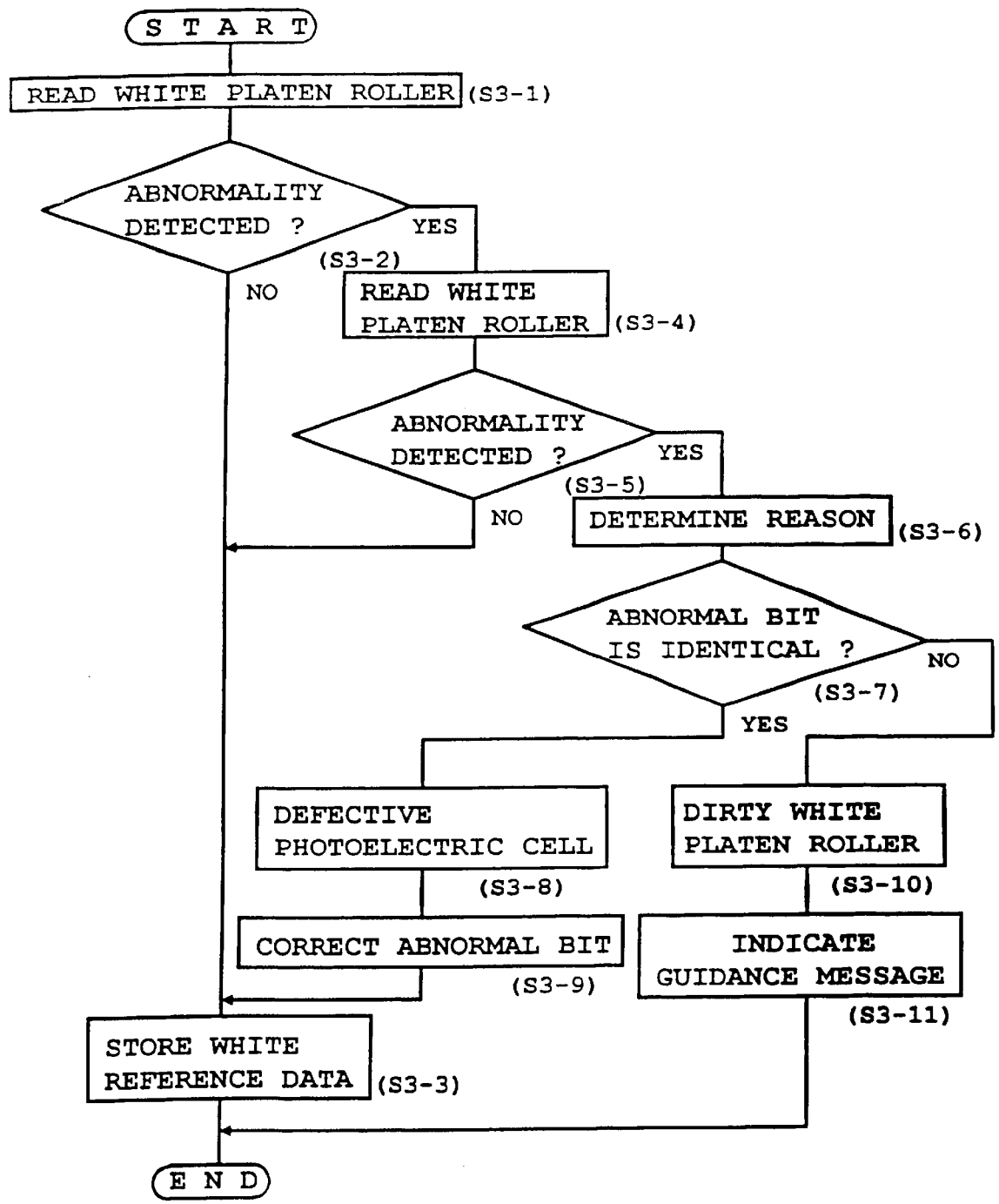
FIG. 10 is a flow chart for a white reference data setting operation according to a another embodiment the present application.

Next, a description of another embodiment of the white reference data setting operation according to the present application is provided with reference to FIG. 10. In FIG. 10, the contact-type image sensor 7 initially reads the white platen roller 10 to obtain white reference data (S3-1). At this time, the motor unit 19 is preferably not energized so the white platen roller 10 is stationary.

Then, the system controller 31 determines whether or not the output signal level of the image sensor is within the predefined characteristics as described above (S3-2). That is, the controller determines whether an abnormality exists in the output signal characteristics of the image sensor.

If an abnormality is not detected, the system controller 31 stores the read output signal characteristics in the parameter memory 33 as white reference data for use in shading correction (S3-3). Once the white reference data is obtained, the motor unit 19 is energized and starts moving the rollers in the a document reading unit 2 to read the document.

If an abnormality is detected in step S3-2, the system controller 31 temporarily stores output signal characteristics (e.g., amplitude and/or bit) in the working memory area in the parameter memory 33, and the motor unit 19 is energized to start moving the rollers in the document reading unit 2. The system controller 31 then stops the motor unit 19 when the S2 sensor detects the head of the document, and the contact-type image sensor 7 then reads a different line (or portion) on the white platen roller 10, preferably, while the motor unit 19 is not energized (S34).

The system controller 31 again determines whether or not there is the abnormality in the output signal characteristics (e.g., amplitude and/or bit) of the image sensor (S3-5). If no abnormality is detected, the system controller 31 stores the newly read output signal characteristics in the parameter memory 33 as white reference data for use in shading correction (S3-3). On the other hand, if an abnormality is again detected (step S3-5), the system controller 31 temporarily stores the newly read output signal characteristics in another working memory area in the parameter memory 33. The controller then determines the cause of the abnormality (S3-6) by, for example, comparing the position of the abnormal bit of the first output signal to the position of the abnormal bit of the second output signal (S3-7). If the position of the abnormal bit is identical, the system controller 31 determines that the abnormality is based on a defective photoelectric cell (S3-8) and carries out the correction of the abnormal bit in a manner described later (S3-9). Then, the system controller 31 stores the corrected output signal characteristics in the parameter memory 33 as white reference data for use in shading correction.

If in step S3-7 the position of the abnormal bit is different, the system controller 31 determines that the abnormality is caused by dirt or other debris on the white platen roller 10 (S3-10), and generates a guidance message instructing an operator to clean the white platen roller, which is displayed on the display panel display (S3-11).

Thus, in the above-described embodiment, it is possible to discriminate the cause of detected abnormalities between instances where dirt or other debris exists is on the white platen roller and instances where the photoelectric cell is defective.

However, instances may occur where dirt or other debris on a white platen roller causes the same bit to reflect an abnormality, which is similar to a faulty photoelectric cell. In such instances, the determination of whether the abnormality is caused by a burr or debris on the roller or a defective photoelectric cell is made by comparing the amplitude of the output signal of the sensor's previous amplitude readings. More particularly, each dirty portion on the roller typically has inconsistencies in density so that the amplitude of the output signal of the image sensor typically varies from one reading to the next. In contrast, if there is a defective photoelectric cell the amplitude of the output signal of the sensor typically remains constant. So, the system controller 31 compares the amplitude of the output signal at the same abnormal bit position between a first output signal reading and second output signal reading.

Thus, in step S3-7 the system controller 31 determines that an abnormality is caused by dirt or other debris on the white platen roller 10 if the bit position and/or amplitude of the output signal of the image sensor at the abnormal bit location is different, or the system controller 21 determines that an abnormality is caused by a faulty photoelectric cell if both the bit position remains constant and output level of the abnormal bit remains substantially constant.

In the above embodiment, it is possible to discriminate whether a detected abnormality is caused by a dirt or other debris on the white platen roller or a faulty photoelectric cell.

Next, two embodiments for a white reference data correction operation when one or more abnormal bits are detected according to the present application will be described. The first embodiment is typically used to select white reference data when a detected abnormality is caused by a dirt or other debris on the white platen roller. The second embodiment is typically used to select white reference data when a detected abnormal bit is caused by either dirt or other debris on the white platen roller or a faulty photoelectric cell or both.

Figure 11A:
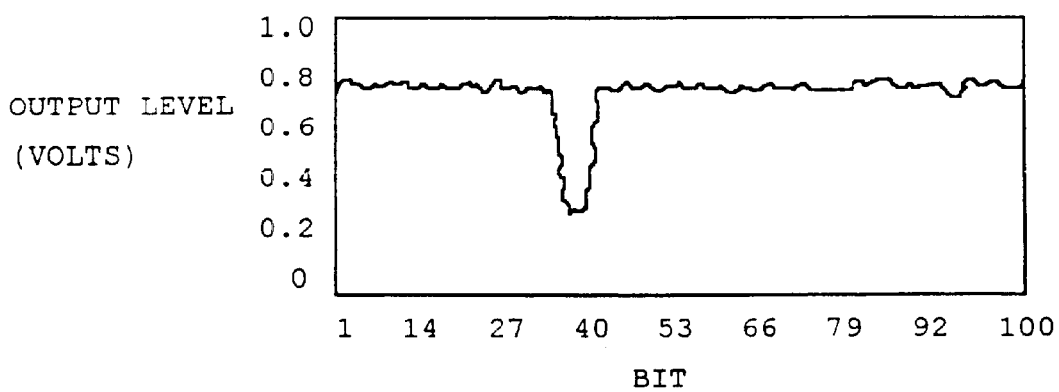
FIGS. 11a–11c are graphs of output signal characteristics of the contact-type image sensor from the white reference data setting operation of FIG. 10.
Figure 11B:
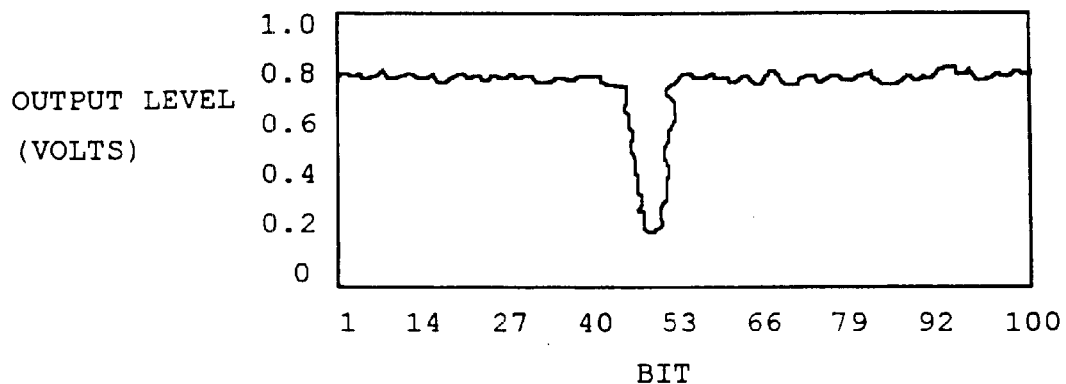
Figure 11C:
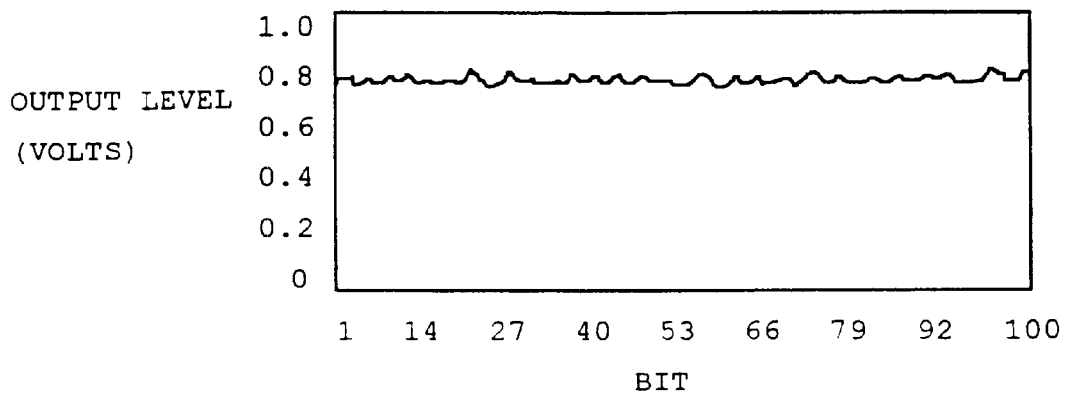

In the first embodiment of the white reference data correction operation, when abnormality is detected, the system controller 31 temporarily stores the output signal characteristics (e.g., amplitude and/or bit) of the image sensor in a working memory area in the parameter memory 33. If the abnormality is detected multiple times and the position of the abnormal bit is different, as seen in FIGS. 11*a* and 11*b*, the system controller 31 compares the amplitudes of the output signals of each abnormal bit. The system controller 31 then produces white reference data by selecting the maximum level about each bit, seen in FIG. 11*c* and stores the selected white reference data in the parameter memory 33. In the embodiment of FIGS. 11*a*–11*c*, the selected output level is about 0.8 volts.

In the second embodiment of the white reference data correction operation, when an abnormality is detected, the system controller 31 temporarily stores the output signal characteristics (e.g., amplitude and/or bit) in a working memory area in the parameter memory 33, and carries out an correcting operation using the output signal characteristics in the working memory area.

Figure 12:
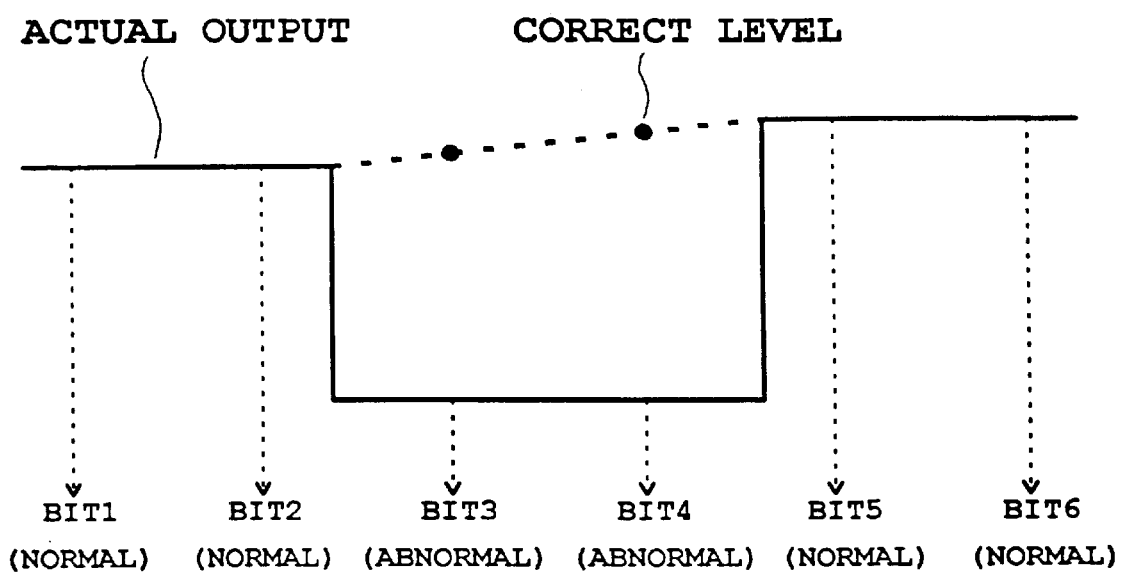
FIG. 12 is a partial waveform of the output signal of the contact-type image sensor.

FIG. 12 shows one example of above mentioned correction operation. In FIG. 12, the solid line shows actual output amplitudes of each photoelectric cell and the broken line shows a corrected level. In FIG. 12, bit numbers 3 and 4 are the continuous abnormal bits, and bit numbers 2 and 5 are normal bits positioned on both sides of the abnormal bits. The system controller 31 corrects the abnormal bit or bits by adjusting the measured the amplitude of the abnormal bits based on the amplitude of the output signal of the normal bits positioned on both sides of the abnormal bit (or bits) and the number of bits from the last normal bit to the next normal bit. For example, in the embodiment of FIG. 12, the output signal amplitude of bit 2 is 7.0 volts and the output signal amplitude of bit 5 is 8.5 volts. In this case, the difference of the output signal amplitude between the normal bits positioned on both sides of the abnormal bits is 1.5 volts (i.e., 8.5−7.0=1.5) and the number of bits from the last normal bit (Bit 2) to the next normal bit (Bit 5) is 3, so that the corrected output signal amplitude is based on 0.5 volts increments. Thus, in this example, the corrected output signal amplitude of bit number 3 becomes 7.5 volts and the corrected output signal amplitude of bit number 4 becomes 8.0 volts. In this manner, sharp contrasts in the output image signal after shading correction can be avoided because the measured output signal amplitude at the abnormal bit positions are incrementally corrected.

Figure 13:
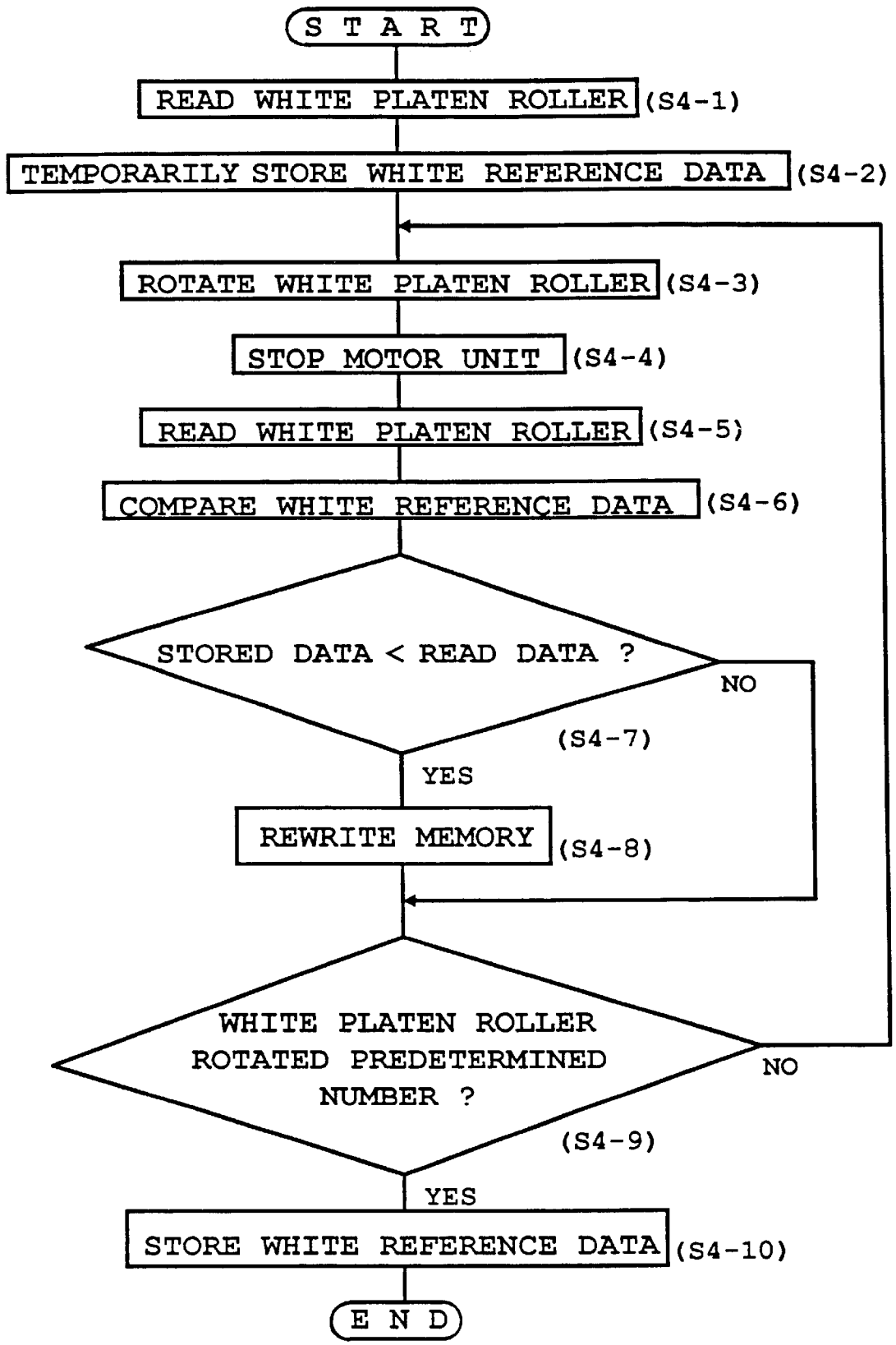
FIG. 13 is a flow chart for a white reference data setting operation according to a another embodiment of the present application.

Referring now to FIG. 13 a description will be given of another embodiment of the white reference data setting operation according to the present application. In FIG. 13, the contact-type image sensor 7 reads the surface of the white platen roller 10 to obtain the white reference data (S4-1). At this time, the motor unit 19 is not energized so the white platen roller 10 is stationary.

The system controller 31 temporarily stores the output signal characteristics which is read at step S4-1 in the working memory of the parameter memory 33 area as white reference data (S4-2). After that, the motor unit 19 is energized and starts moving of the rollers in the a document reading unit 2 to feed the document (S4-3).

The system controller 31 stops the motor unit 19 when the white platen roller 10 is rotated at predetermined angular value, e.g., 120 degrees (S4-4). At this time, the head of the document does not reach the image reading portion, so the contact-type image sensor 7 is able to read a different line (or portion) of the white platen roller 10, preferably, again while the motor unit 19 is not energized (S4-5).

Then, the system controller 31 compares the white reference data stored in the working memory area of the parameter memory 33 to the newly read output signal characteristics (e.g., amplitude and/or bit) on a bit by bit basis (S4-6). For each bit in this embodiment, if the newly read output signal amplitude is greater than the stored output signal amplitude, the system controller 31 rewrites the greater amplitude into a corresponding bit location of the working memory area.

The system controller 31 then determines whether the white platen roller is read a predetermined number of times, wherein the white platen roller is rotated a predetermined angular value between each reading (S4-9). If the roller has not been read the predetermined number of times the motor unit 19 is energized and starts moving the rollers in the document reading unit 2 so that the white plate roller 10 is again read after the roller is rotated the predetermined angular value (step S4-3). The loop from step S4-3 to S4-8 is repeated until the number of times the platen roller has been read equals the predetermined value.

When the number of times the platen roller has been read equals the predetermined value, the white reference data stored in the working memory area at that time is moved to the main parameter memory 33 as the final white reference data (S4-10).

Alternatively, the system controller 31 can temporarily store the output signal characteristics into the working memory area each time the platen roller is read and then compare the output signal characteristics after finishing reading the white platen roller 10 the predetermined number of times. Then, the system controller 31 stores the results of the comparison into the main parameter memory 33 as white reference data.

In this embodiment, the maximum output signal amplitude used as the white reference data stored in the main parameter memory 33 is obtained by repeating the above mentioned operation a number of times so that it is possible to omit the detection of an abnormal bit or bits. Further, it is also possible to avoid the adverse effects caused by burrs on the white platen roller by selecting a suitable predetermined angular value for rotating the white platen roller 10 between readings so that the portions of the roller having the burrs are not read by the image sensor. Of course, the start point for reading the roller is also a factor to be considered when determining a suitable angular value. Typically, 180 degrees is suitable for avoiding the adverse effect caused by burrs on the white platen roller.

Furthermore, as noted above, it is also possible to avoid mixing noise generated by the motor with the output signal characteristics of the image sensor which may affect the white reference data, by having the contact-type image sensor 7 read the white platen roller 10 when the motor unit 19 is not energized.

Figure 14:
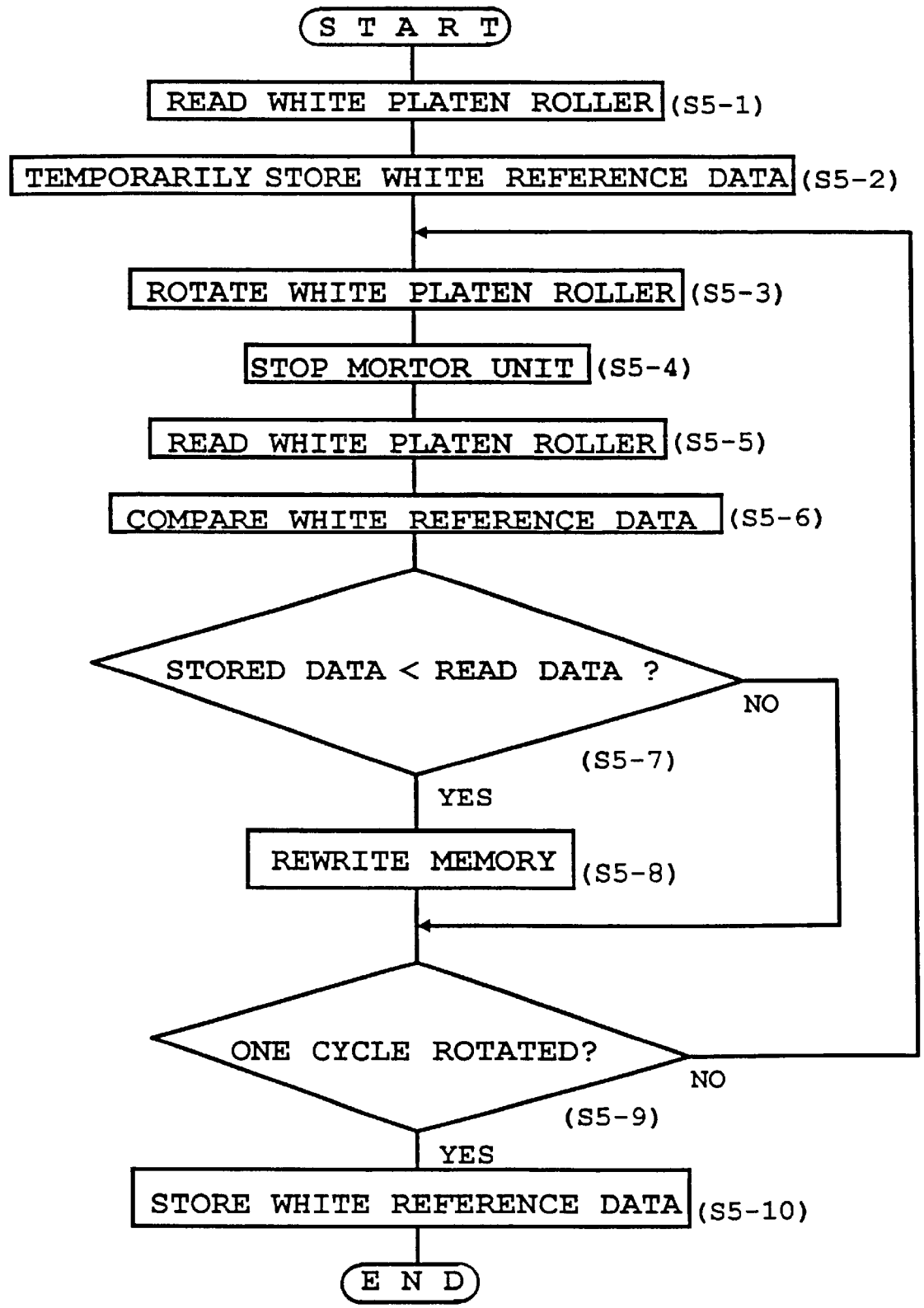
FIG. 14 is a flow chart for a white reference data setting operation according to a another embodiment of the present application.

Referring now to FIG. 14, a description will be given of another embodiment of the white reference data setting operation according to the present application. In FIG.14, the contact-type image sensor 7 reads a line (or portion) of the white platen roller 10 and generate output signal characteristics (e.g., amplitude and/or bit) used to obtain white reference data (S5-1). At this time, the motor unit 19 is preferably not energized and the white platen roller 10 is stationary.

The system controller 31 then temporarily stores the output signal characteristics which are read at step S5-1 in the working memory area of the parameter memory 33 as white reference data (S5-2). After that, the motor unit 19 is energized and starts moving the rollers in the document reading unit 2 to feed the document (S5-3). The system controller 31 stops the motor unit 19 when the white plate roller 10 is rotated a predetermined angular value, e.g., 120 degrees (S5-4). At this time, the head of the document does not reach the image reading portion so the contact-type image sensor 7 is able to read a different line (or portion) of the white platen roller 10, preferably, while the motor unit 19 is not energized (S5-5).

Then, the system controller 31 compares the white reference data stored in the working area to the newly read output signal characteristics (e.g., output signal amplitude) on a bit by bit basis (S5-6). For each bit in this embodiment, if the newly read output signal amplitude is greater than the output signal amplitude stored in the working memory area, the system controller 31 rewrites the greater amplitude into a corresponding bit location of the working memory area (S5-8).

The system controller 31 then determines whether the white platen roller 10 has rotated at least one cycle (i.e., 360°) (S5-9). If the platen roller has not rotated at least one cycle, the motor unit 19 is energized and starts moving of the rollers in the document reading unit 2, and the white plate roller 10 is again rotated the predetermined angular value (step S5-3). The loop from step S5-3 to S5-8 is repeated until the white platen roller 10 has rotated at least one cycle.

When the contact-type image sensor 7 reads the surface of the white platen roller 10 over at least one cycle, the white reference data stored in the working memory area at that time is moved to the main parameter memory 33 as the final white reference data (S5-10).

Alternatively, the system controller 31 can temporarily store the output signal characteristics into the working memory area each time the platen roller is read and then compares the output signal characteristics after finishing reading the white platen roller over at least one cycle. Then, the controller stores the results of the comparison into the main parameter memory 33 as white reference data.

In this embodiment, the maximum output signal amplitude used as the white reference data stored in the main parameter memory 33 is obtained by repeating the above mentioned operation until that the white platen roller 10 is rotated at least one cycle so that it is possible to omit the detection of an abnormal bit or bits.

Further, it is also possible to avoid the adverse effect of burrs on the platen roller by selecting a suitable predetermined angular value for rotating the white platen roller 10, as described above.

Furthermore, in this embodiment it is also possible to avoid the mixing of noise caused by the motor into the white reference data by having the contact-type image sensor 7 read the white platen roller 10 when the motor unit 19 is not energized.

Obviously, numerous modifications and variations of the present invention are possible in light of the above teachings. It is therefore to be understood that within the scope of the appended claims, the invention may be practiced otherwise than as specifically described herein.

This application is based on Japanese Application No. 9-173976 filed Jun. 30. 1997 and Japanese Application No. 10-96184 filed Apr. 8, 1998, both of which are incorporated herein by reference.

What is claimed is:

1. A document reading apparatus comprising:
   a white platen roller positioned at an image reading portion and used to provide white reference data used for shading correction for the document reading apparatus;
   an image sensor positioned in the image reading area and used to selectively read the white platen roller, and to output signal characteristic data after reading the white platen roller; and
   a controller configured to control the reading of the white platen roller so that the image sensor reads the white platen roller a predetermined number of times, and to control movement of the white platen roller such that a motor used to move the white platen roller is de-energized when the image sensor reads the white platen roller;
   wherein the controller receives the output signal characteristic data and compares the read output signal characteristic data to pre-existing signal characteristic data to determine if an abnormality exists in the read output signal characteristic data, such that when an abnormality is determined for read output signal characteristic data, the read output signal characteristic data is not used as white reference data; and such that when no abnormality is determined for read output signal characteristic data, the controller stores in memory the output signal characteristic data as white reference data.

2. The document reading apparatus according to claim 1, wherein the white platen roller is read at least two times and moved a predetermined angular value between each reading.

3. The document reading apparatus according to claim 1, wherein the pre-existing output signal characteristic data comprises user entered data stored in memory.

4. The document reading apparatus according to claim 1, wherein the pre-existing output signal characteristic data comprises output signal characteristic data from an earlier reading of the white platen roller by the image sensor.

5. The document reading apparatus according to claim 1, wherein the image sensor comprises an array of photoelectric cells and the output signal characteristic data for each cell in the array includes a bit location and a signal amplitude.

6. The document reading apparatus according to claim 5, wherein the pre-existing signal characteristic data comprises a signal amplitude and the controller compares the read signal amplitude to the pre-existing signal amplitude to determine if an abnormality exists in the read output signal characteristic data.

7. The document reading apparatus according to claim 6, wherein an abnormality exists when the read output signal amplitude for at least one bit is less than the pre-existing amplitude.

8. The document reading apparatus according to claim 7, wherein the controller determines a cause of the abnormality by comparing each bit location with a read output signal amplitude that is less than the pre-existing amplitude for a first reading of the white platen roller to each bit location with a read output signal amplitude that is less than the pre-existing amplitude for at least a second reading of the white platen roller.

9. The document reading apparatus according to claim 8, wherein the controller determines the cause of the abnormality to be a dirty white platen roller when the compared bit location between readings of the white platen roller differ, or when the compared bit locations between each reading of the white platen roller are the same and the read output signal amplitude at each bit location differ.

10. The document reading apparatus according to claim 9 further comprising a display operatively coupled to the controller, wherein the controller causes a guidance message to clean the white platen roller to be displayed on the display when the abnormality is caused by a dirty white platen roller.

11. The document reading apparatus according to claim 7, wherein the controller determines the cause of the abnormality to be a faulty image sensor when the compared bit location for each reading of the white platen roller is the same and the read output signal amplitude for each reading is substantially the same.

12. The document reading apparatus according to claim 11 further comprising a display operatively coupled to the controller, wherein the controller causes a guidance message to repair the image sensor to be displayed on the display when the abnormality is caused by a faulty image sensor.

13. The document reading apparatus according to claim 7, wherein the controller determines a cause of the abnormality by comparing each bit location and amplitude associated with a read output signal amplitude that is less than the pre-existing amplitude for a first reading of the white platen roller to each bit location and amplitude associated with a read output signal amplitude that is less than the pre-existing amplitude for at least a second reading of the white platen roller.

14. The document reading apparatus according to claim 13, wherein the controller determines the cause of the abnormality to be a burr on the white platen roller when the compared bit location between readings of the white platen roller are the same and the read output signal amplitude at each bit location is substantially the same.

15. A document reading apparatus, comprising:
   a white platen roller positioned at an image reading portion of the document reading apparatus, the white platen roller being used to feed an original document through the image reading portion and for setting white reference data used for shading correction;
   an image sensor positioned in the image reading portion that reads the white platen roller and original document and that generates output signal characteristic data after the white platen roller and original document are read; and
   a controller that detects an abnormality of the output signal characteristic data and determines a cause of the detected abnormality by comparing the detected output signal characteristic data to pre-existing output signal characteristic data.

16. The document reading apparatus according to claim 15, wherein the image sensor reads the white platen roller a predetermined number of times, and wherein the controller is configured to control the reading of the white platen roller and the original document, such that the controller controls movement of the white platen roller so that a motor used to move the white platen roller is de-energized when the image sensor reads the white platen roller.

17. The document reading apparatus according to claim 15, wherein the pre-existing output signal characteristic data comprises user entered data stored in memory.

18. The document reading apparatus according to claim 15, wherein the pre-existing output signal characteristic data comprises output signal characteristic data from an earlier reading of the white platen roller by the image sensor.

19. The document reading apparatus according to claim 15, wherein the controller performs a white reference data correction operation to correct output signal characteristic data when an abnormality is detected.

20. The document reading apparatus according to claim 15, wherein the image sensor comprises an array of photoelectric cells and the output signal characteristic data for each cell in the array includes a bit location and signal amplitude.

21. The document reading apparatus according to claim 20, wherein the controller performs a white reference data correction operation to correct a read output signal amplitude when an abnormality is detected at a bit location.

22. The document reading apparatus according to claim 20, wherein the pre-existing signal characteristic data comprises a signal amplitude and the controller compares the read signal amplitude to the pre-existing signal amplitude to determine if an abnormality exists in the read output signal characteristic data.

23. The document reading apparatus according to claim 22, wherein an abnormality exists when the read output signal amplitude for at least one bit is less than the pre-existing amplitude.

24. The document reading apparatus according to claim 23, wherein the controller determines a cause of the abnormality by comparing each bit location with a read output signal amplitude that is less than the pre-existing amplitude for a first reading of the white platen roller to each bit location with a read output signal amplitude that is less than the pre-existing amplitude for at least a second reading of the white platen roller.

25. The document reading apparatus according to claim 24, wherein the controller determines the cause of the abnormality to be a dirty white platen roller when the compared bit location between readings of the white platen roller differ, or when the compared bit locations between each reading of the white platen roller are the same and the read output signal amplitude at each bit location differ.

26. The document reading apparatus according to claim 25 further comprising a display operatively coupled to the controller, wherein the controller causes a guidance message to clean the white platen roller to be displayed on the display when the abnormality is caused by a dirty white platen roller.

27. The document reading apparatus according to claim 23, wherein the controller determines the cause of the abnormality to be a faulty image sensor when the compared bit location for each reading of the white platen roller is the same and the read output signal amplitude for each reading is substantially the same.

28. The document reading apparatus according to claim 27 further comprising a display operatively coupled to the controller, wherein the controller causes a guidance message to repair the image sensor to be displayed on the display when the abnormality is caused by a faulty image sensor.

29. The document reading apparatus according to claim 23, wherein the controller determines a cause of the abnormality by comparing each bit location and amplitude associated with a read output signal amplitude that is less than the pre-existing amplitude for a first reading of the white platen roller to each bit location and amplitude associated with a read output signal amplitude that is less than the pre-existing amplitude for at least a second reading of the white platen roller.

30. The document reading apparatus according to claim 29, wherein the controller determines the cause of the abnormality to be a burr on the white platen roller when the compared bit location between readings of the white platen roller are the same and the read output signal amplitude at each bit location is substantially the same.

31. The reading apparatus according to claim 15, wherein the controller determines an abnormality by comparing an signal amplitude at each bit location with a signal amplitude at adjacent bit locations.

32. The document reading apparatus according to claim 31, wherein an abnormality exists when the read output signal amplitude for at least one bit is less than the pre-existing amplitude.

33. The document reading apparatus according to claim 32, wherein the controller determines a cause of the abnormality by comparing each bit location with a read output signal amplitude that is less than the pre-existing amplitude for a first reading of the white platen roller to each bit location with a read output signal amplitude that is less than the pre-existing amplitude for at least a second reading of the white platen roller.

34. The document reading apparatus according to claim 33, wherein the controller determines the cause of the abnormality to be a dirty white platen roller when the compared bit location between readings of the white platen roller differ, or when the compared bit locations between each reading of the white platen roller are the same and the read output signal amplitude at each bit location differ.

35. The document reading apparatus according to claim 34 further comprising a display operatively coupled to the controller, wherein the controller causes a guidance message to clean the white platen roller to be displayed on the display when the abnormality is caused by a dirty white platen roller.

36. The document reading apparatus according to claim 32, wherein the controller determines the cause of the abnormality to be a faulty image sensor when the compared bit location for each reading of the white platen roller is the same and the read output signal amplitude for each reading is substantially the same.

37. The document reading apparatus according to claim 36 further comprising a display operatively coupled to the controller, wherein the controller causes a guidance message to repair the image sensor to be displayed on the display when the abnormality is caused by a faulty image sensor.

38. The document reading apparatus according to claim 32, wherein the controller determines a cause of the abnormality by comparing each bit location and amplitude associated with a read output signal amplitude that is less than the pre-existing amplitude for a first reading of the white platen roller to each bit location and amplitude associated with a read output signal amplitude that is less than the pre-existing amplitude for at least a second reading of the white platen roller.

39. The document reading apparatus according to claim 38, wherein the controller determines the cause of the abnormality to be a burr on the white platen roller when the compared bit location between readings of the white platen roller are the same and the read output signal amplitude at each bit location is substantially the same.

40. A method for reading an original document with a document reading apparatus comprising:

reading a white platen roller in an image reading portion and generating first output signal characteristic data;

storing the first output signal characteristic data;

energizing a motor used to move the white platen roller and feeding the original document;

de-energizing the motor before the original document reaches the image reading portion;

reading a different portion of white platen roller in an image reading portion and generating second output signal characteristic data;

comparing the first and second output characteristic data; and storing the first or second output signal characteristic data as white reference data based on a result of the comparing.

41. The method according to claim 40, wherein the step of comparing comprises comparing the output characteristic data to obtain a maximum output characteristic data as white reference data.

42. A method for reading an original document with a document reading apparatus comprising:

reading a white platen roller in an image reading portion before an original document is read and generating output signal characteristic data;

comparing of the detected output signal characteristic data to pre-existing output signal characteristic data and determining if an abnormality exists in the output signal characteristic data; and determining a cause of the detected abnormality based on the output signal characteristic data.

43. The method according to claim 42, wherein the step of comparing comprising comparing of the detected output signal characteristic data to user entered data stored in memory.

44. The method according to claim 42, wherein the step of comparing comprising comparing of the detected output signal characteristic data to output signal characteristic data from an earlier reading of the white platen roller by the image sensor.

45. The method according to claim 42, further comprising correcting a output signal characteristic data when an abnormality is detected.

46. The method according to claim 42, wherein the step of comparing comprising comparing an output signal amplitude for each bit location of the image sensor representing an array of photoelectric cells to pre-existing output signal characteristic data.

47. The method according to claim 46, further comprising selecting an output signal amplitude closest to the pre-existing data as the white reference data.

48. The method according to claim 46, further comprising correcting output signal characteristic data when an abnormality is detected at a bit location.

49. The method according to claim 42, wherein the step of comparing comprising comparing an output signal amplitude for each bit location of the image sensor representing an array of photoelectric cells to a signal amplitude at an adjacent bit location.

50. The method according to claim 42, wherein the step of reading comprising reading the white platen roller while a motor which moves the white platen roller is not energized.

51. The method according to claim 50, wherein the step of reading the white platen roller comprises reading the white platen roller a predetermined number of times, and wherein the white platen roller is moved a predetermined angular value between readings.

52. A method according to claim 42, wherein the step of determining comprises determining a cause of the abnormality between a case where dirt is on the white platen roller and a case where a faulty image sensor exists.

53. The method according to claim 42, wherein the step of reading comprises reading the white platen roller before the image sensor reads each original document.

* * * * *